(12) United States Patent
Nelson et al.

(10) Patent No.: US 11,421,767 B2
(45) Date of Patent: Aug. 23, 2022

(54) TORQUE CONVERTER WITH FLEXIBLE CLUTCH PLATE

(71) Applicant: Schaeffler Technologies AG & Co. KG, Herzogenaurach (DE)

(72) Inventors: Kyle Nelson, Wadsworth, OH (US); Victor Norwich, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/166,069

(22) Filed: Feb. 3, 2021

(65) Prior Publication Data

US 2021/0246975 A1 Aug. 12, 2021

Related U.S. Application Data

(60) Provisional application No. 62/971,109, filed on Feb. 6, 2020.

(51) Int. Cl.
*F16H 45/02* (2006.01)

(52) U.S. Cl.
CPC ..... *F16H 45/02* (2013.01); *F16H 2045/0215* (2013.01); *F16H 2045/0221* (2013.01); *F16H 2045/0273* (2013.01); *F16H 2045/0294* (2013.01)

(58) Field of Classification Search
CPC ............. F16H 45/02; F16H 2045/0215; F16H 2045/0221; F16H 2045/0273; F16H 2045/0294; F16H 2045/021; F16H 2045/0263

See application file for complete search history.

(56) References Cited

U.S. PATENT DOCUMENTS

| | | | |
|---|---|---|---|
| 9,995,381 B2 | 6/2018 | Adari | |
| 10,465,782 B2 | 11/2019 | Vanni et al. | |
| 2008/0000745 A1* | 1/2008 | Swank | F16H 45/02 192/3.29 |
| 2008/0277227 A1* | 11/2008 | Jameson | F16H 45/02 192/3.33 |
| 2014/0034442 A1* | 2/2014 | Jimenez | B21J 15/02 192/110 R |
| 2018/0238397 A1* | 8/2018 | Clark | F16F 15/1215 |
| 2018/0259047 A1* | 9/2018 | Hess | F16H 41/28 |

* cited by examiner

*Primary Examiner* — Ernesto A Suarez
*Assistant Examiner* — Mark A Manley

(57) ABSTRACT

A torque converter comprising a front cover, an impeller having an impeller shell connected to the front cover, a turbine having a turbine shell and at least one blade attached thereto, and a lock-up clutch configured to selectively couple the turbine shell to the impeller shell for torque transmission therebetween is provided. In embodiments, the lock-up clutch comprises a clutch plate connected to the turbine shell and extending radially outward therefrom. The clutch plate may include a first end, a second end, and a slot defined between the first and the second ends. The lock-up clutch further may include a piston connected to the front cover, and a piston actuation plate connected to the piston, wherein the piston is configured to actuate the piston actuation plate to close the lock-up clutch to connect the turbine shell to the impeller shell.

17 Claims, 2 Drawing Sheets

TORQUE CONVERTER WITH FLEXIBLE CLUTCH PLATE

CROSS-REFERENCE TO RELATED APPLICATIONS

This application claims benefit to U.S. Provisional Patent Application No. 62/971109, filed Feb. 6, 2020, the disclosure of which is incorporated in its entirety by reference herein.

TECHNICAL FIELD

The present disclosure relates generally to torque converters and more specifically to torque converters having a clutch integrated with the turbine.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a case of the torque converter to bypass the fluid coupling. In some torque converters, the lock-up clutch may be integrated with the turbine.

SUMMARY

In general, embodiments of the present disclosure provide a torque converter comprising a front cover, an impeller having an impeller shell connected to the front cover, a turbine having a turbine shell and at least one blade attached thereto, and a lock-up clutch configured to selectively couple the turbine shell to the impeller shell for torque transmission therebetween. In embodiments, the lock-up clutch comprises a clutch plate connected to the turbine shell and extending radially outward therefrom. The clutch plate may include a first end, a second end, and a slot defined between the first and the second ends. The lock-up clutch further may include a piston connected to the front cover, and a piston actuation plate connected to the piston, wherein the piston is configured to actuate the piston actuation plate to close the lock-up clutch to connect the turbine shell to the impeller shell.

In embodiments, the torque converter further comprises a seal dam plate adjacent and connected to the front cover, wherein the piston is connected to the seal dam plate at an inner diameter and connected to the front cover at an outer diameter. The seal dam plate may be arranged for connection with a transmission input shaft via a seal at an inner diameter thereof, and a retention clip may be disposed between the front cover and the seal dam plate and configured to retain the seal. In embodiments, the seal dam plate includes a first groove and a second groove radially outward of the first groove; the seal is disposed in the first groove; and the retention clip is disposed in the second groove. In embodiments, the retention clip includes a first radial segment in contact with the front cover, a second radial segment in contact with the seal, and an axial segment connecting the first and the second radial segments. In embodiments, the piston actuation plate is connected to the piston via a tabbed connection and the clutch plate is connected to the turbine shell via a tab-rolled connection. An apply chamber may be formed, at least in part, by the front cover, the piston, and the seal dam plate.

In embodiments, the piston is configured to displace in an axial direction toward the turbine such that the piston actuation plate actuates to press the clutch plate against the impeller shell for clutch engagement in response to pressurized fluid being supplied to the apply chamber. In embodiments, the first end of the clutch plate is connected to the turbine shell and the second end is disposed axially between the piston actuation plate and the impeller shell. A first friction facing is affixed to one of the piston actuation plate and the second end of the clutch plate; and a second friction facing is affixed to one of the second end of the clutch plate and the impeller shell.

In embodiments, a torque converter comprises a front cover, an impeller having an impeller shell connected to the front cover, a turbine having a turbine shell, a lock-up clutch, a seal dam plate adjacent and connected to the front cover, wherein the seal dam plate is arranged for connection with a transmission input shaft via a seal, and a retention clip disposed between the front cover and the seal dam plate and configured to retain the seal. The lock-up clutch may include a clutch plate connected to the turbine shell and extending radially outward therefrom and a piston actuation plate connected to the piston, wherein the piston is configured to actuate the piston actuation plate to close the lock-up clutch to connect the turbine shell to the impeller shell. A damper may be disposed axially between the piston and the turbine, wherein the piston actuation plate is connected to the piston radially outside of the damper.

Embodiments provide the advantageous benefit of reduced costs and complexity of three-pass torque converters, for example, by removing a hub that is typically used to direct flow to appropriate apply and cooling circuits. Furthermore, embodiments disclosed herein offer design flexibility by adjusting the radial placement of the clutch plate to the turbine, material thickness of the clutch plate, and material removal slots, which all can reduce axial clutch plate stiffness. As an added benefit, the turbine shell no longer needs to be machined before clutch facings are bonded.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
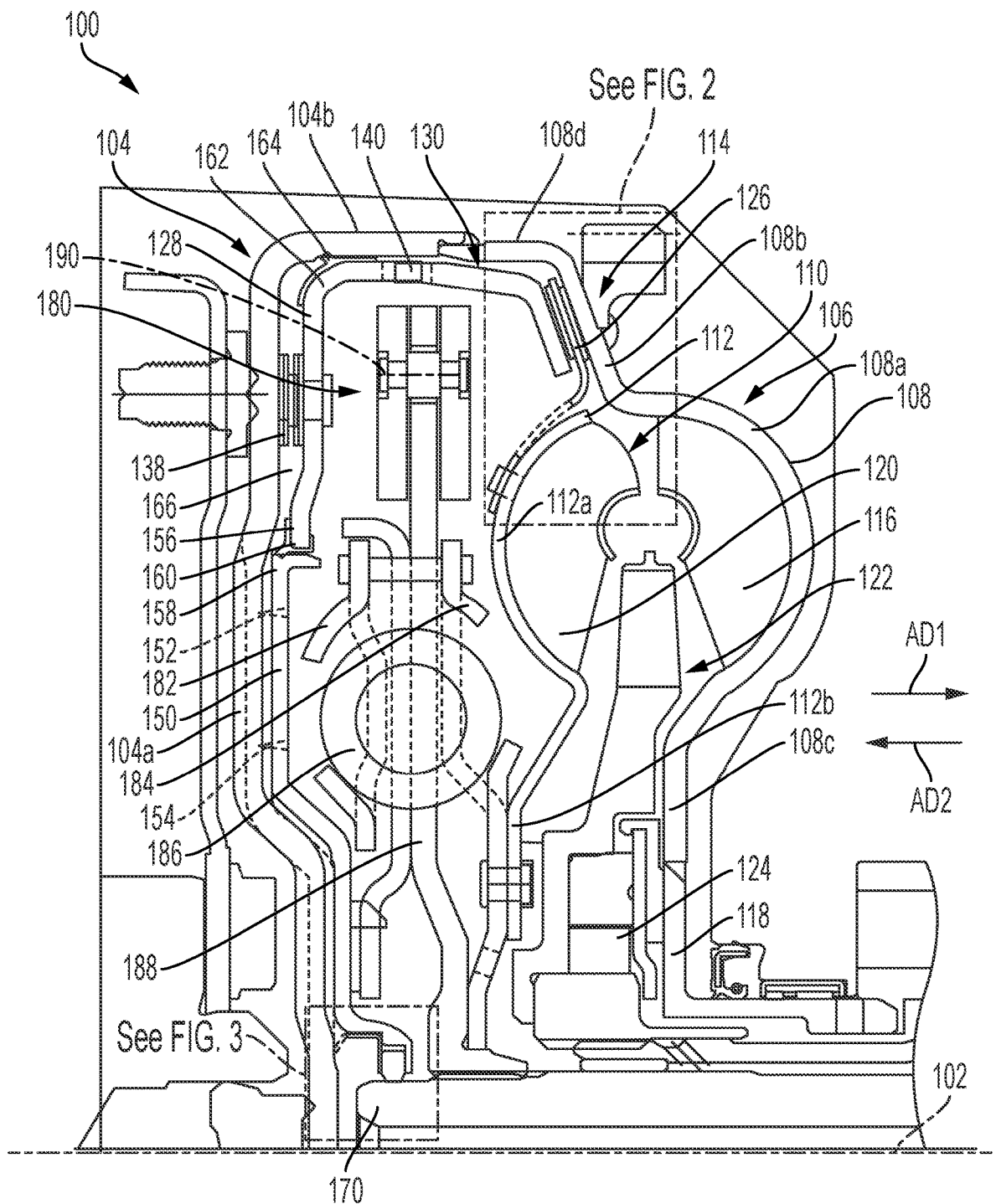
FIG. 1 is a cross-sectional view of a torque converter according to an embodiment of the present disclosure.
Figure 3:
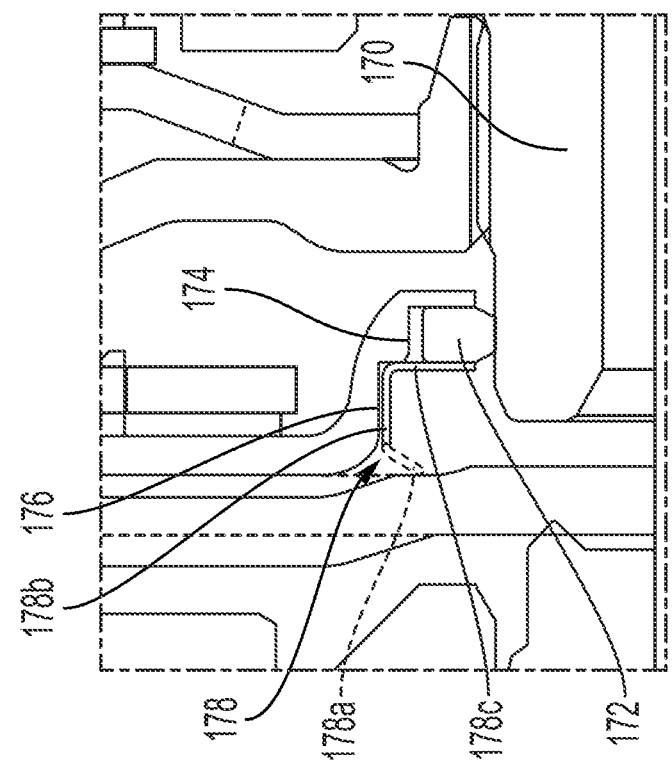
FIG. 3 is an enlarged view of an area of the torque converter of FIG. 1 showing a sealing arrangement for the seal dam plate.
Figure 2:
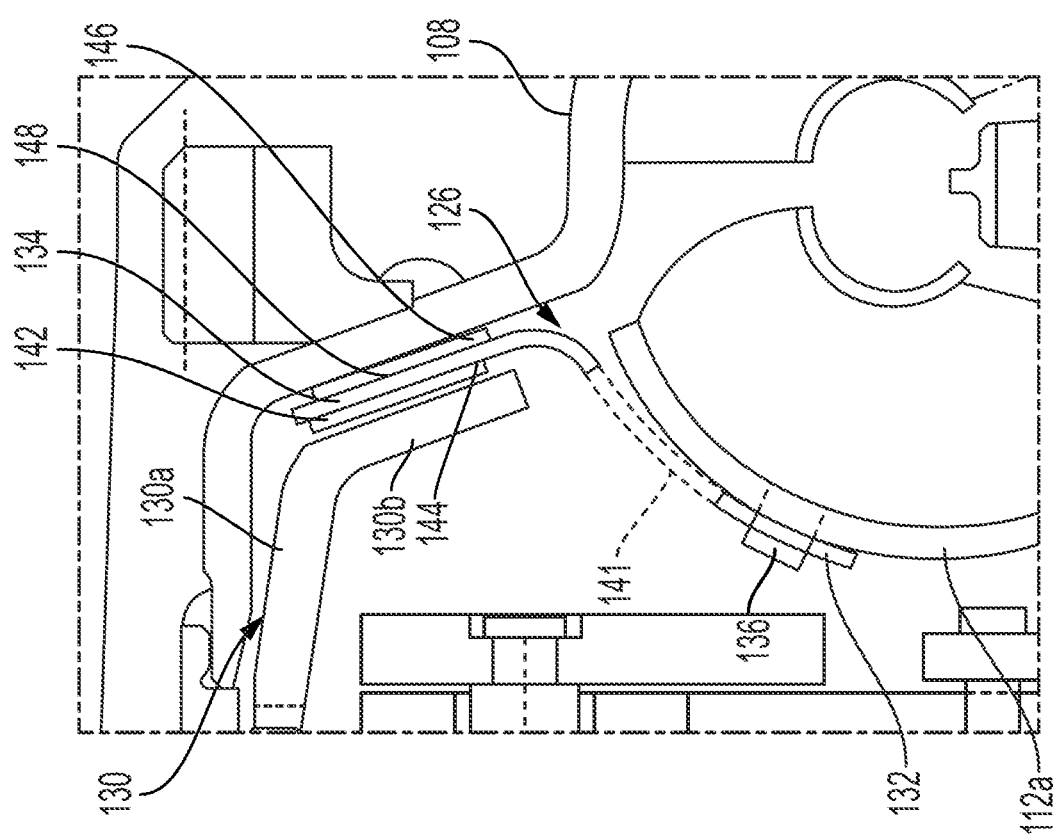
FIG. 2 is an enlarged view of an area of the torque converter of FIG. 1 showing the lock-up clutch.

FIGS. 1-3 show a torque converter 100 in accordance with embodiments of the present disclosure. The following description is made with reference to FIGS. 1-3. Torque converter 100 is rotatable about center axis 102 and includes: front cover 104 for connecting to a crankshaft of an internal combustion engine; impeller 106 including impeller shell 108 non-rotatably fixed to front cover 104; turbine 110 fluidly coupled to impeller 106 and including turbine shell 112; and lock-up clutch 114 formed in part by impeller shell 108 and turbine shell 112. Torque converter 100 further includes stator 122 coupled to a stator shaft by one-way clutch 124, for example. Rotation of impeller 106 forces fluid to move between impeller 106, turbine 110, and stator 122. The fluid exerts a hydrodynamic torque on turbine 110. Stator 122 provides a reaction force causing the torque on turbine 110 to be greater than the torque on impeller 106. When the speed of turbine 110 approaches that of impeller 106, fluid tends to flow around the centerline of the torque converter, causing one-way clutch 124 to overrun. Components that are non-rotatably fixed rotate in unison. The terms axially, radially and circumferentially as used herein are used with respect to center axis 102.

Front cover 104 includes radially extending section 104a that extends substantially perpendicular to center axis 102 and axially extending section 104b that extends substantially parallel to center axis 102. Impeller shell 108 includes: rounded blade support portion 108a for supporting blades 116 attached thereto; outer radial extension 108b extending radially outward of rounded blade portion 108a and forming part of lock-up clutch 114; inner radial extension 108c extending radially inward from rounded blade support portion 108a that, at an inner end thereof, is fixed to impeller hub 118 (e.g., by welding); and axially extending section 108d extending from a radially outermost end of radial extension 108b and fixed to axially extending section 104b of front cover 104 (e.g., by welding). Outer radial extension 108b, rounded blade portion 108a, inner radial extension 108c, and axially extending section 108d of impeller shell 108 may be formed integrally as a single piece. Likewise, turbine shell 112 includes: rounded blade support portion 112a for supporting blades 120 attached thereto and inner radial extension 112b extending radially inward from rounded blade support portion 112a.

Lock-up clutch 114 further includes: clutch plate 126 attached to rounded blade support portion 112a of turbine shell 112 and extending radially outward therefrom; piston 128; and piston actuation plate 130. Clutch plate 126 may include a first end 132 (shown in FIG. 2) connected to rounded blade support portion 112a of turbine shell 112 and a second end 134 disposed axially between impeller shell 108 and piston actuation plate 130. First end 132 of clutch plate 126 may be connected to turbine shell 112 via a tab-rolled connection, for example. That is, clutch plate 126 may be tab-rolled after turbine blades 120 are brazed and fixed to turbine shell 112. For example, turbine blades 120 may each include a tab 136 extending radially outward and through turbine shell 112 that is configured to be received within a corresponding slot or opening defined in first end 132 of clutch plate 126 and then rolled to fix clutch plate 126 to turbine shell 112. In one embodiment, the turbine blades 120 may be stamped with at least two tabs, installed in turbine shell 112 in corresponding slots, wherein one of the at least two tabs is rolled and then brazed to turbine shell 112 and the other of the at least two tabs is configured to be received within a corresponding slot in first end 132 of clutch plate 126 wherein it is then rolled or bent to fix clutch plate 126 to turbine shell 112. Clutch plate 126 further may include cut-outs or slots 141 between first end 132 and second end 134 to reduce axial clutch plate stiffness. Clutch plate 126 offers axial compliance to clutch 114 to reduce and/or remove impacts of torus drive and coast loading on clutch 114.

Piston 128 of lock-up clutch 114 may be connected to radially extending section 104a of front cover 104, for example, by leaf-spring connection 138 that allows axial movement of piston 128 in axial direction AD1 and axial direction AD2, opposite axial direction AD1, to engage and disengage clutch 114 to selectively transmit torque between turbine shell 112 and impeller shell 108 (i.e., mechanically couple turbine 110 to cover 104 to bypass the hydrodynamic fluid coupling). Piston 128 is further connected to piston actuation plate 130 via connection 140. Connection 140 may be a tabbed connection that allows for thrust to be transferred therethrough. Piston actuation plate 130 may include axially extending section 130a substantially parallel to center axis 102 connected to piston 128 at one end and radially extending section 130b extending radially inward toward center axis 102 from another, opposite end of axially extending section 130a.

During clutch apply conditions, piston 128 may be configured to actuate piston actuation plate 130 to press clutch plate 126 against impeller shell 108 to connect turbine shell 112 to impeller shell 108 for torque transmission therebetween. That is, piston 128 displaces in axial direction AD1 toward impeller 106, thrusting through connection 140, actuating piston actuation plate 130 such that radially extending section 130b presses second end 134 of clutch plate 126 against outer radial extension 108b of impeller shell 108. That is, turbine 110 is mechanically connected to impeller shell 108 to bypass the hydrodynamic power flow path of the torque converter when clutch 114 is closed. Friction material or facing 142 may be disposed between, and affixed to one of, radially extending section 130b or first side 144 of clutch plate 126. Friction material or facing 146 may be disposed between, and affixed to one of, second side 148 of clutch plate 126 or outer radial extension 108b of impeller shell 108. In embodiments, friction facing 142 is affixed to first side 144 and friction facing 146 is affixed to second side 148 of clutch plate 126.

Torque converter 100 further includes seal dam plate 150 adjacent, and fixed, to radially extending section 104a of front cover 104. Seal dam plate 150 may be rigidly fixed to front cover 104 via welded connections 152, 154, for example. It is to be understood that seal dam plate 150 may be fixed to front cover 104 via alternative arrangements, for example, riveting. This connection allows for stiffness in seal dam plate 150, as high or significant deflection may occur at high speeds and pressures. Piston 128 may be connected to seal dam plate 150. That is, inner diameter 156 of piston 128 may be connected to outer diameter 158 of seal dam plate 150 via seal 160. Outer diameter 162 of piston 128 may be sealed to axially extending section 104b of front cover 104 via seal 164 to form an apply chamber 166 for engagement of clutch 114. Pressurized fluid may be supplied from transmission input shaft 170 to apply chamber 166 to displace piston 128 in axial direction AD1 toward impeller shell 108 to engage or close clutch 114 for transmission of torque therebetween.

Seal dam plate 150 may further be centered on and connected to transmission input shaft 170 (see FIG. 3). Seal plate 150 may be connected to transmission input shaft via seal 172, for example. Moreover, seal plate may include a first groove 174 and second groove 176 radially outward of first groove 174. Seal 172 may be positioned or disposed within first groove 174. Retention clip 178 may be disposed, at least partially, within second groove 176 and configured to retain seal 172, thereby allowing seal retention within seal plate 150. Retention clip 178 further includes a portion in contact with: cover 104, second groove 176, and seal 172. That is, retention clip 178 may include radial segment 178a contacting cover 104, axial segment 178b contacting seal dam plate 150, and radial segment 178c contacting seal 172 and holding seal 172 within first groove 174, wherein radial segments 178a and 178c are connected by axial segment 178b. In this way, retention clip 178 acts as a sealing glad; thereby, allowing sealing without stamping and machining a thicker seal plate. Retention clip 178 may be a sheet steel clip, for example. Retention clip 178 may further include slots or openings defined in radial segment 178a (represented by dashed lines) to allow for flow of fluid into apply chamber 166.

Torque converter 100 may also include damper assembly 180 positioned between cover 104 and turbine 110 that is configured for transferring torque from turbine 110 to transmission input shaft 170. Damper assembly may include: cover input plates 182, 184; springs 186, output flange 188; and centrifugal pendulum absorber (CPA) 190. Turbine shell 112 may be connected to cover input plate 184, for example, via a riveted connection.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
102 center axis
104 front cover
104a radially extending section
104b axially extending section
106 impeller
108 impeller shell
108a rounded blade support portion
108b outer radial extension
108c inner radial extension
108d axially extending section
110 turbine
112 turbine shell
112a rounded blade support portion
112b inner radial extension
114 lock-up clutch
116 blades
118 impeller hub
120 blades
122 stator
124 one-way clutch
126 clutch plate
128 piston
130 piston actuation plate
130a axially extending section
130b radially extending section
132 first end
134 second end
136 tab
138 leaf-spring connection
140 connection
141 slots
142 friction facing
144 first side of clutch plate
146 friction facing
148 second side of clutch plate
150 seal dam plate
152 connections
154 connections
156 inner diameter
158 outer diameter
160 seal
162 outer diameter
164 seal
166 apply chamber
170 transmission input shaft
172 seal
174 first groove
174 seal
176 second groove
178 retention clip
178a radial segment
178b axial segment
178c radial segment
180 damper assembly
182 plates
184 plates
186 springs
188 output flange
190 centrifugal pendulum absorber CPA

What is claimed is:

1. A torque converter comprising:
a front cover;
an impeller having an impeller shell connected to the front cover and at least one blade attached to the impeller shell;
a turbine having a turbine shell and at least one blade attached thereto;
a damper assembly positioned between the front cover and the turbine, the damper assembly including first and second cover input plates supporting springs therebetween, wherein one of the first and the second cover input plates is connected to the turbine shell; and a lock-up clutch configured to selectively couple the turbine shell to the impeller shell for torque transmission therebetween, the lock-up clutch comprising:
- a clutch plate connected to the turbine shell and extending radially outward therefrom, the clutch plate including a first end connected to a blade supporting portion of the turbine shell radially outside of the first and the second cover input plates, a second end, and a slot defined between the first and the second ends;
- a piston connected to the front cover; and
- a piston actuation plate connected to the piston, wherein the piston is configured to actuate the piston actuation plate to close the lock-up clutch to connect the clutch plate to a radially extending portion of the impeller shell.

2. The torque converter of claim 1, further comprising a seal dam plate adjacent and connected to the front cover, wherein the piston is connected to the seal dam plate at an inner diameter and connected to the front cover at an outer diameter.

3. The torque converter of claim 2, wherein:
the seal dam plate is arranged for connection with a transmission input shaft via a seal at an inner diameter thereof; and
a retention clip is disposed between the front cover and the seal dam plate and configured to retain the seal.

4. The torque converter of claim 3, wherein:
the seal dam plate includes a first groove and a second groove radially outward of the first groove;
the seal is disposed in the first groove; and
the retention clip is disposed in the second groove.

5. The torque converter of claim 4, wherein the retention clip includes a first radial segment in contact with the front cover, a second radial segment in contact with the seal, and an axial segment connecting the first and the second radial segments.

6. The torque converter of claim 1, wherein the piston actuation plate is connected to the piston via a tabbed connection.

7. The torque converter of claim 1, wherein the clutch plate is connected to the turbine shell via a tab-rolled connection.

8. The torque converter of claim 2, wherein an apply chamber is formed, at least in part, by the front cover, the piston, and the seal dam plate.

9. The torque converter of claim 8, wherein the piston is configured to displace in an axial direction toward the turbine such that the piston actuation plate actuates to press the clutch plate against the impeller shell for clutch engagement in response to pressurized fluid being supplied to the apply chamber.

10. The torque converter of claim 1, wherein the at least one blade of the turbine includes a tab extending radially outward and through an opening in the turbine shell, wherein the tab is configured to be received within a corresponding slot defined in the first end of the clutch plate to fix the clutch plate to the turbine shell and the second end is disposed axially between the piston actuation plate and the impeller shell.

11. The torque converter of claim 10, wherein:
a first friction facing is affixed to one of the piston actuation plate and the second end of the clutch plate; and
a second friction facing is affixed to one of the second end of the clutch plate and the impeller shell.

12. A torque converter comprising:
a front cover;
an impeller having an impeller shell connected to the front cover and at least one blade attached to the impeller shell;
a turbine having a turbine shell and at least one blade attached thereto;
a lock-up clutch configured to selectively couple the turbine shell to the impeller shell for torque transmission therebetween, the lock-up clutch comprising:
- a clutch plate connected to the turbine shell and extending radially outward therefrom;
- a piston connected to the front cover; and
- a piston actuation plate connected to the piston, wherein the piston is configured to actuate the piston actuation plate to close the lock-up clutch to connect the turbine shell to the impeller shell;

a seal dam plate adjacent and connected to the front cover, wherein the seal dam plate is arranged for connection with a transmission input shaft via a seal; and
a retention clip disposed between the front cover and the seal dam plate and configured to retain the seal, wherein the retention clip includes a first radial segment in contact with the front cover, a second radial segment in contact with the seal, and an axial segment connecting the first and the second radial segments.

13. The torque converter of claim 12, wherein the seal dam plate includes a first groove and a second groove radially outward of the first groove, the seal is disposed in the first groove, and the retention clip is disposed in the second groove.

14. The torque converter of claim 12, wherein the clutch plate includes a first end, a second end, and a slot defined between the first and the second ends.

15. The torque converter of claim 12, wherein the piston is connected to the seal dam plate via a first seal at an inner diameter and connected to the front cover at an outer diameter via a second seal.

16. The torque converter of claim 15, wherein an apply chamber is formed, at least in part, by the seal dam plate, the first seal, the piston, the second seal, and the front cover.

17. The torque converter of claim 12, further comprising a damper disposed axially between the piston and the turbine, wherein the piston actuation plate is connected to the piston radially outside of the damper.

* * * * *